United States Patent
Bai et al.

(10) Patent No.: US 10,968,344 B2
(45) Date of Patent: Apr. 6, 2021

(54) POLYESTER COMPOSITION SUITABLE FOR ULTRASONIC WELDING AND PREPARATION METHOD THEREOF

(71) Applicant: SHANGHAI KUMHOSUNNY PLASTICS CO., LTD., Shanghai (CN)

(72) Inventors: Liangui Bai, Shanghai (CN); Qiang Li, Shanghai (CN); Minghua Luo, Shanghai (CN); Minqi Xin, Shanghai (CN)

(73) Assignee: SHANGHAI KUMHOSUNNY PLASTICS CO., LTD., Shanghai (CN)

(*) Notice: Subject to any disclaimer, the term of this patent is extended or adjusted under 35 U.S.C. 154(b) by 2 days.

(21) Appl. No.: 16/473,590

(22) PCT Filed: Dec. 30, 2016

(86) PCT No.: PCT/CN2016/113470
§ 371 (c)(1),
(2) Date: Jun. 25, 2019

(87) PCT Pub. No.: WO2018/120008
PCT Pub. Date: Jul. 5, 2018

(65) Prior Publication Data
US 2020/0140675 A1    May 7, 2020

(30) Foreign Application Priority Data
Dec. 26, 2016 (CN) .......................... 201611219020.3

(51) Int. Cl.
| | | |
|---|---|---|
| *C08L 55/02* | (2006.01) |
| *B29C 65/08* | (2006.01) |
| *C08G 63/183* | (2006.01) |
| *C08J 3/12* | (2006.01) |
| *C08K 5/00* | (2006.01) |
| *C08K 5/103* | (2006.01) |
| *C08K 5/134* | (2006.01) |
| *C08K 5/20* | (2006.01) |
| *C08K 5/524* | (2006.01) |
| *C08K 5/5419* | (2006.01) |
| *C08L 23/26* | (2006.01) |

(52) U.S. Cl.
CPC ............ *C08L 55/02* (2013.01); *B29C 65/082* (2013.01); *C08G 63/183* (2013.01); *C08J 3/12* (2013.01); *C08K 5/005* (2013.01); *C08K 5/103* (2013.01); *C08K 5/134* (2013.01); *C08K 5/20* (2013.01); *C08K 5/524* (2013.01); *C08K 5/5419* (2013.01); *C08L 23/26* (2013.01); *C08L 2205/03* (2013.01); *C08L 2207/062* (2013.01)

(58) Field of Classification Search
USPC ........................................................ 525/316
See application file for complete search history.

(56) References Cited

FOREIGN PATENT DOCUMENTS

| | | |
|---|---|---|
| CN | 101220198 | 7/2008 |
| CN | 101418111 | 4/2009 |
| CN | 101418111 A | 4/2009 |
| CN | 104004332 | 8/2014 |
| JP | 2003142399 | 5/2003 |
| KR | 20160063877 | 6/2016 |
| WO | 2016199054 | 12/2016 |

OTHER PUBLICATIONS

First office action of 201611219020.3.
Second office action of 201611219020.3.
RO/101 of PCT/CN2016/113470.
Written Opinion of PCT/CN2016/113470.
International Search Report of PCT/CN2016/113470.
Third office action of 201611219020.3.

*Primary Examiner* — Terressa Boykin
(74) *Attorney, Agent, or Firm* — Dragon Sun Law Firm, PC; Jinggao Li, Esq.

(57) ABSTRACT

The present disclosure provides a polyester composition suitable for ultrasonic welding and preparation method thereof, the composition includes the following components in parts by weight: 30~50 parts of poly(1,4-cyclohexylene dimethylene terephthalate), 40~60 parts of ABS, 5~10 parts of a melt enhancer, 0.1~1 parts of an antioxidant, and 0.1~1 parts of a lubricant. Compared with the existing technologies, the polyester composition provided by the present disclosure improves melt strength by using the melt enhancer. The melt enhancer used is an ultra-high density polyethylene resin having a glycidyl methacrylate group after an irradiation treatment, so that the compatibility of the melt enhancer to the poly(1,4-cyclohexylene dimethylene terephthalate) is improved. In addition, by controlling a glass-transition temperature of the composition, no chipping is generated during ultrasonic welding, and the composition has a high welding strength, which is suitable for ultrasonic welding.

18 Claims, No Drawings

POLYESTER COMPOSITION SUITABLE FOR ULTRASONIC WELDING AND PREPARATION METHOD THEREOF

CROSS-REFERENCE TO RELATED APPLICATIONS

This application is a national stage application of PCT Application No. PCT/CN2016/113470. This application claims priority from PCT Application No. PCT/CN2016/113470, filed Dec. 30, 2016, and CN Application No. 201611219020.3, filed Dec. 26, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the field of polymer materials, and more particularly to a polyester composition suitable for ultrasonic welding and preparation method thereof.

BACKGROUND

Ultrasonic welding is transmitted to two objects surfaces to be welded by using high-frequency vibration waves, in the case of pressurization, the two objects surfaces rub against each other to form a fusion between molecular layers. Due to a large acoustic resistance of the soldering zone, local high temperature is generated; plastic has a poor thermal conductivity, and heat cannot be dissipated in time, which causes the plastic of the contact surface is rapidly melted, and after a certain pressure, it is fused together to achieve the purpose of welding. In addition, a molten state of the contact surfaces of two plastics affects welding strength.

Ultrasonic welding as a rapid welding mode and can be widely applied to automobile lamps, especially automotive tail lamps. Automotive tail lamps need to weld a transparent article of PMMA with a PC/ABS shell. While PMMA and PC/ABS are prone chipping and have a low welding strength during ultrasonic welding.

Compared with PC (polycarbonate), poly(1,4-cyclohexylene dimethylene terephthalate) contains a cyclohexane dimethanol ester functional group, and a glass transition temperature thereof lower than PC and more closer to PMMA. LDPE is a high molecular weight resin that can effectively increase melt strength, but has compatibility problems with polyester and ABS materials. Therefore, it is difficult to mix LDPE with polyester and ABS to prepare a composition with a good compatibility in the existing technologies.

SUMMARY

Against the deficiencies in the existing technologies, the present disclosure provides a polyester composition suitable for ultrasonic welding and preparation method thereof.

The object of the present disclosure is achieved by the following technical solutions.

The present disclosure provides a polyester composition suitable for ultrasonic welding, where the polyester composition includes the following components in parts by weight:
- 30~50 parts of poly(1,4-cyclohexylene dimethylene terephthalate),
- 40~60 parts of ABS,
- 5~10 parts of a melt enhancer,
- 0.1~1 parts of an antioxidant, and
- 0.1~1 parts of a lubricant.

Preferably, in the poly(1,4-cyclohexylene dimethylene terephthalate), 1,4-cyclohexanedimethanol has a content of 70~90%.

Preferably, the poly(1,4-cyclohexylene dimethylene terephthalate) has a weight-average molecular weight of 25,000-40,000.

Preferably, ABS has a weight-average molecular weight of 120,000~150,000.

Preferably, the melt enhancer is an ultra-high density polyethylene resin (HDPE) having a glycidyl methacrylate group, and has a weight-average molecular weight thereof of 3,000,000~5,000,000. It is difficult for HDPE to perform functional group modification, but irradiation with cobalt 60 by adopting a chemical irradiation method, so that can bring a glycidyl methacrylate group on the surface of HDPE, thereby further improving compatibility between HDPE and the substrate. If a molecular weight of HDPE is too low, a good solution-enhancing effect cannot be obtained; and if the molecular weight is too high, the compatibility between HDPE and substrate is also insufficient after the chemical irradiation.

Preferably, a preparation method of the melt enhancer includes steps of:
(1) Preparing a methanol solution having a mass fraction of 30% glycidyl methacrylate;
(2) placing the ultra-high density polyethylene resin under a cobalt 60 with an air irradiation 10-100 kGy, and after being taken out, mixing it with the methanol solution prepared in step (1), reacting to obtain the melt enhancer.

Preferably, in step (2), a solid-liquid ratio of the irradiated ultra-high density polyethylene resin to the methanol solution prepared in step (1) is 1 g:10 ml.

Preferably, in step (2), a temperature of the reaction is 60-70° C., a reaction time is 4-6 hours.

Preferably, the antioxidant includes one or more of a commercially available antioxidant 245, an antioxidant 1076, and an antioxidant 168; and the lubricant includes one or more of silicone powder, pentaerythritol ester, and N,N'-ethylenedi(stearamide).

The present disclosure further provides a preparation method of the polyester composition suitable for ultrasonic welding described above, including steps of:
weighing components in proportion, blending and granulating a resulting mixture obtained by mixing the components, after a melt extrusion, further granulating to obtain the polyester composition suitable for ultrasonic welding.

Compared with the existing technologies, the present disclosure has the following beneficial effects:

The polyester composition provided by the present disclosure obtains a melt enhancer that compatible with other material by a chemical irradiation method, and the use the melt enhancer can increase the melt strength, and meanwhile by controlling the glass transition temperature of the composition, so that no chipping is generated during ultrasonic welding, and the welding strength is high, which is suitable for ultrasonic welding.

DETAILED DESCRIPTION

The present disclosure will be described in detail with reference to specific examples. The following examples will help those skilled in the art to further understand the present disclosure but not limit the present disclosure in any form. It should be noted that a number of variations and modifications may be made by those skilled in the art without departing from the conception of the present disclosure. These are all within the protection scope of the present disclosure.

In the following examples and comparative examples, a content of 1,4-cyclohexanedimethanol ester in the poly(1,4-cyclohexylene dimethylene terephthalate) PCT1 used is 80%, a content of 1,4-cyclohexanedimethanol ester in PCT2 is 40%, ABS used is ABS3513 produced by High-bridge petrochemical; PC used is L1225L of TEIJIN; HDPE1 used is 2462H of SINOPEC, and HDPE2 is 2462H having a glycidyl methacrylate group; the antioxidants is Irganox 1076 and Irganox 168 of Ciba company with a weight ratio of 1:1; and the lubricant is a commercially available pentaerythritol stearic acid.

A preparation method of HDPE2 includes steps of:
(1) preparing a methanol solution having a mass fraction of 30% glycidyl methacrylate;
(2) placing HDPE 2462H under a cobalt 60 with an air irradiation 10-100 kGy, after being taken out, mixing it with the solution of step (1) in a ratio of 1 g:10 ml, reacting at a temperature of 60-70° C. for 5 hours.

Comparative Example 1

A polyester composition suitable for ultrasonic welding and a preparation method thereof, the method including steps of:
(1) weighing components in part by weight as follows: 40 parts of PCT2, 50 parts of ABS, 10 parts of HDPE1, 0.1~1 parts of an antioxidant, and 0.1~1 parts of a lubricant;
(2) feeding raw materials above from a feed port, melt extruding at 200~280° C. with a rotating speed of screw extruder of 500 rpm and a pressure of 2 MPa, after being melt extrusion, granulating to obtain a product.
(3) a screw diameter of the extruder is 35 mm, and a length-diameter ratio thereof is 32.

Comparative Example 2

A polyester composition suitable for ultrasonic welding and a preparation method thereof, the method including steps of:
(1) weighing components in part by weight as follows: 50 parts of PCT1, 40 parts of ABS, 10 parts of HDPE1, 0.1~1 parts of an antioxidant, and 0.1~1 parts of a lubricant;
(2) feeding raw materials above from a feed port, melt extruding at 200~280° C. with a rotating speed of screw extruder of 500 rpm and a pressure of 2 MPa, after being melt extrusion, granulating to obtain a product.
(3) a screw diameter of the extruder is 35 mm, and a length-diameter ratio thereof is 44.

Example 1

A polyester composition suitable for ultrasonic welding and a preparation method thereof, the method including steps of:
(1) weighing components in part by weight as follows: 30 parts of PCT1, 60 parts of ABS, 10 parts of HDPE2, 0.1~1 parts of an antioxidant, and 0.1~1 parts of a lubricant;
(2) feeding raw materials above from a feed port, melt extruding at 200~280° C. with a rotating speed of screw extruder of 500 rpm and a pressure of 2 MPa, after being melt extrusion, granulating to obtain a product.
(3) a screw diameter of the extruder is 35 mm, and a length-diameter ratio thereof is 32.

Example 2

A polyester composition suitable for ultrasonic welding and a preparation method thereof, the method including steps of:
(1) weighing components in part by weight as follows: 50 parts of PCT1, 45 parts of ABS, 5 parts of HDPE2, 0.1~1 parts of an antioxidant, and 0.1~1 parts of a lubricant;
(2) feeding raw materials above from a feed port, melt extruding at 200~280° C. with a rotating speed of screw extruder of 500 rpm and a pressure is 2 MPa, after being melt extrusion, granulating to obtain a product.
(3) a screw diameter of the extruder is 35 mm, and a length-diameter ratio thereof is 32.

Example 3

A polyester composition suitable for ultrasonic welding and a preparation method thereof, the method including steps of:
(1) weighing components in part by weight as follows: 35 parts of PCT1, 60 parts of ABS, 5 parts of HDPE2, 0.1~1 parts of an antioxidant, and 0.1~1 parts of a lubricant;
(2) feeding raw materials above form a feed port, melt extruding at 200~280° C. with a rotating speed of screw extruder is 500 rpm and a pressure is 2 MPa, after being melt extrusion, granulating to obtain a product.
(3) a screw diameter of the extruder is 35 mm, and a length-diameter ratio thereof is 32.

Comparative Example 3

The comparative example provides a polyester composition suitable for ultrasonic welding and preparation method thereof, which is basically the same as the Example 1, and the difference is only in that: the polyester used in the comparative example is PC.

Comparative Example 4

The comparative example provides a polyester composition suitable for ultrasonic welding and preparation method thereof, which is basically the same as the Example 1, and the difference is only in that: in this comparative example, the PCT1 has 20 parts by weight, and ABS has 80 parts by weight.

Comparative Example 5

The comparative example provides a polyester composition suitable for ultrasonic welding and preparation method thereof, which is basically the same as the Example 1, and the difference is only in that in this comparative example, the PCT has 60 parts by weight, and ABS has 30 parts by weight.

Effects Test:

The polyester compositions prepared in each of the comparative examples and the examples is injection molded into sample strips having a size of 100 mm*10 mm*2 mm, which is placed with transparent PMMA plate in a staggered pattern, and are welded by ultrasonic. A amplitude is 30 KHZ, a welding time is 0.5 s, a pressurize time is 1 s. A PMMA sample is clamped at one end of a clamp of a tensile testing machine, and a sample strip is clamped at other end, welding strength is calculated by measuring tensile strength, where the welding strength is equal to the tensile strength/ (width of a welding joint*length of the welding joint).

TABLE 1

| | Comparative example 1 | Comparative example 2 | Example 1 | E.xample 2 | Example 3 | Comparative example 3 | Comparative example 4 | Comparative example 5 |
|---|---|---|---|---|---|---|---|---|
| Article appearance | fogging with peeling | fogging with peeling | OK | OK | OK | fogging with peeling | OK | fogging with peeling |
| Welding strength (N/mm$^2$) | 4.5 | 6.2 | 19 | 13 | 18 | 1.3 | 3.5 | 5.1 |
| Weld joint appearance | serious chipping | serious chipping | No chipping | No chipping | slightly chipping | serious chipping | serious chipping | serious chipping |

As can be seen from the above table, the polyester composition provided by the present disclosure improves melt strength by using the melt enhancer, and meanwhile by controlling the glass transition temperature of the composition, so that no chipping is generated during ultrasonic welding, and the welding strength is high, which is suitable for ultrasonic welding.

There are many specific application paths of the present disclosure, and the above description is only preferred examples of the present disclosure. It should be noted that the above examples are merely illustrative of the present disclosure but not intended to limit the protection scope of the present disclosure. A number of modifications may be made by those skilled in the art without departing from the principles of the present disclosure, and such modifications are also should be considered to be within the protection scope of the present disclosure.

What is claimed is:

1. A polyester composition suitable for ultrasonic welding, wherein the composition comprises the following components in parts by weight:
   30~50 parts of poly(1,4-cyclohexylene dimethylene terephthalate),
   40~60 parts of ABS,
   5~10 parts of a melt enhancer,
   0.1~1 parts of an antioxidant, and
   0.1~1 parts of a lubricant.

2. The polyester composition suitable for ultrasonic welding according to claim 1, wherein in the poly(1,4-cyclohexylene dimethylene terephthalate), 1,4-yclohexanedimethanol has a mass percentage of 70~90%.

3. The polyester composition suitable for ultrasonic welding according to claim 1, wherein the poly(1,4-cyclohexylene dimethylene terephthalate) has a weight-average molecular weight of 25,000-40,000.

4. The polyester composition suitable for ultrasonic welding according to claim 1, wherein the ABS has a weight-average molecular weight of 120,000~150,000.

5. The polyester composition suitable for ultrasonic welding according to claim 1, wherein the melt enhancer is an ultra-high density polyethylene resin having a glycidyl methacrylate group, and has a weight-average molecular weight of 3,000,000~5,000,000.

6. The polyester composition suitable for ultrasonic welding according to claim 1, wherein a preparation method of the melt enhancer comprises steps of:
   (1) preparing a methanol solution having a mass fraction of 30% glycidyl methacrylate;
   (2) placing the ultra-high density polyethylene resin under a cobalt 60 with an air irradiation 10-100 kGy, and after being taken out, mixing it with the methanol solution prepared in step (1), reacting to obtain the melt enhancer.

7. The polyester composition suitable for ultrasonic welding according to claim 6, wherein in step (2), a solid-liquid ratio of an irradiated ultra-high density polyethylene resin to the methanol solution prepared in step (1) is 1 g: 10 ml.

8. The polyester composition suitable for ultrasonic welding according to claim 6, wherein in step (2), a reaction temperature is 60-70° C., and a reaction time is 4-6 hours.

9. The polyester composition suitable for ultrasonic welding according to claim 1, wherein the antioxidant comprises one or more of a commercially available antioxidant 245, an antioxidant 1076, and an antioxidant 168; and the lubricant comprises one or more of silicone powder, pentaerythritol ester, and N,N'-ethylenedi(stearamide).

10. A method for preparing the polyester composition suitable for ultrasonic welding according to claim 1, comprising steps of:
   weighing components in proportion, blending and granulating a resulting mixture obtained by mixing the components, after a melt extrusion, further granulating to obtain the polyester composition suitable for ultrasonic welding.

11. The method for preparing the polyester composition suitable for ultrasonic welding according to claim 10, wherein in the poly(1,4-cyclohexylene dimethylene terephthalate), 1,4-yclohexanedimethanol has a mass percentage of 70~90%.

12. The method for preparing the polyester composition suitable for ultrasonic welding according to claim 10, wherein the poly(1,4-cyclohexylene dimethylene terephthalate) has a weight-average molecular weight of 25,000-40,000.

13. The method for preparing the polyester composition suitable for ultrasonic welding according to claim 10, wherein the ABS has a weight-average molecular weight of 120,000~150,000.

14. The method for preparing the polyester composition suitable for ultrasonic welding according to claim 10, wherein the melt enhancer is an ultra-high density polyethylene resin having a glycidyl methacrylate group, and has a weight-average molecular weight of 3,000,000~5,000,000.

15. The method for preparing the polyester composition suitable for ultrasonic welding according to claim 10, wherein a preparation method of the melt enhancer comprises steps of:
   (1) preparing a methanol solution having a mass fraction of 30% glycidyl methacrylate;
   (2) placing the ultra-high density polyethylene resin under a cobalt 60 with an air irradiation 10-100 kGy, and after being taken out, mixing it with the methanol solution prepared in step (1), reacting to obtain the melt enhancer.

16. The polyester composition suitable for ultrasonic welding according to claim 15, wherein in step (2), a solid-liquid ratio of an irradiated ultra-high density polyethylene resin to the methanol solution prepared in step (1) is 1 g:10 ml.

17. The polyester composition suitable for ultrasonic welding according to claim 15, wherein in step (2), a reaction temperature is 60-70° C., and a reaction time is 4-6 hours.

18. The method for preparing the polyester composition suitable for ultrasonic welding according to claim 10, wherein the antioxidant comprises one or more of a commercially available antioxidant 245, an antioxidant 1076, and an antioxidant 168; and the lubricant comprises one or more of silicone powder, pentaerythritol ester, and N,N'-ethylenedi(stearamide).

\* \* \* \* \*